Figure 1:
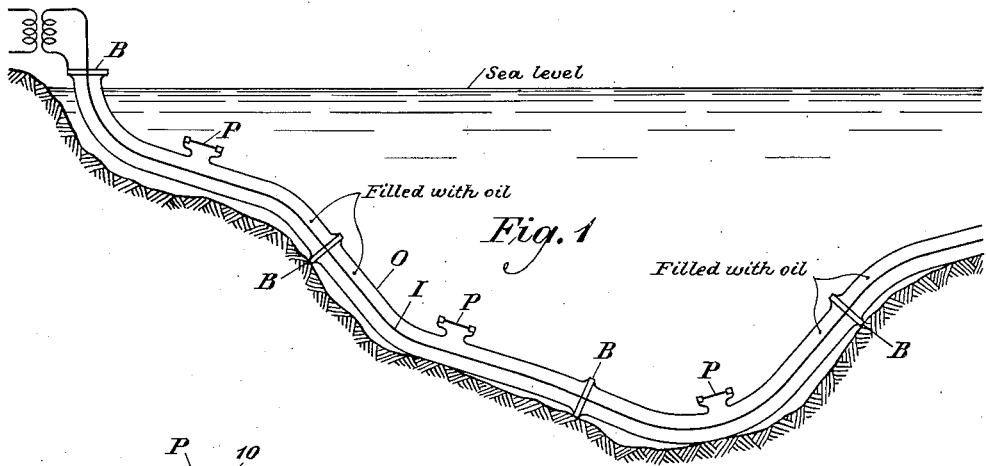

Sept. 27, 1932.     W. H. T. HOLDEN     1,879,746
SUBMARINE CONCENTRIC CONDUCTOR SYSTEM
Filed Aug. 18, 1930     2 Sheets-Sheet 1

INVENTOR
W. H. T. Holden
BY
ATTORNEY

Patented Sept. 27, 1932

1,879,746

UNITED STATES PATENT OFFICE

WILLIAM H. T. HOLDEN, OF BROOKLYN, NEW YORK, ASSIGNOR TO AMERICAN TELEPHONE AND TELEGRAPH COMPANY, A CORPORATION OF NEW YORK

SUBMARINE CONCENTRIC CONDUCTOR SYSTEM

Application filed August 18, 1930. Serial No. 476,103.

This invention relates to concentric conductor transmission systems, and more particularly to a concentric conductor system so designed as to permit of being used for submarine transmission.

Heretofore it has been proposed to construct a transmission system of two concentric cylindrical conductors one arranged inside the other, with the space between the two conductors filled by air or other suitable gaseous dielectric except for occasional spacing washers of good dielectric material to give the structure the necessary mechanical stability. Such a system has the advantage that it will transmit frequencies as high as 5,000,000 cycles or more without undue attenuation, whereas an ordinary two-wire line is incapable of the transmission of such high frequencies. A concentric conductor system of the type described is also relatively free from external voltages tending to produce cross-talk.

While these advantages of the concentric conductor system have been well recognized, it has been assumed that such a system could not be successfully employed for submarine transmission because the excessive pressure of the water surrounding the outer conductor would tend to crush the cable unless substantially the entire space between the inner and outer conductors was filled with solid dielectric material, in which case the high frequency transmission advantages of the system would be lost.

Applicant has discovered, however, that the difficulties due to the external water pressure may be to a large extent avoided by using a liquid dielectric, such as oil, between the inner and outer conductors. While oil has a higher power factor than air, its power factor is so much smaller than solid dielectrics that a considerable part of the high frequency transmission advantages of the concentric conductor system would be retained.

In order to equalize the internal and external pressures acting upon the outer cylindrical conductor, it is proposed to provide flexible water-tight diaphragms in the outer conductor. These diaphragms are arranged to yield inwardly but not to yield outwardly. If the entire system from end to end is open to the flow of the dielectric liquid, the difference between the specific gravity of water and oil would produce through the yielding diaphragm an external pressure tending to force the dielectric liquid out at the ends of the outer pipe of the conductor system. If parts of the conductor system were laid at great depths under water, this resultant external pressure at the ends might be sufficient to burst open the outer conductor. In order to avoid this difficulty, it is proposed to divide the conducting system longitudinally into relatively short sections separated from each other by transverse barriers in the space between the inner and outer conductors, so that longitudinal flow of the dielectric liquid from one section to the other would be prevented. By such a construction it is possible to have all parts of the system at zero or small internal pressure rather than subjected to a large external pressure.

While a system of the type herein proposed would not have as low an attenuation at high frequencies as a concentric conductor system employing air dielectric, the power factor of the liquid dielectric used in the system of the present invention is so much lower than that of a solid dielectric that it is possible, in a circuit of 100 miles or more in length, to transmit frequencies up to 60 or perhaps 100 kilocycles without undue attenuation. This would render it possible to provide for 12 to 16 two-way voice channels or 72 to 96 two-way telegraph channels.

Figure 2:
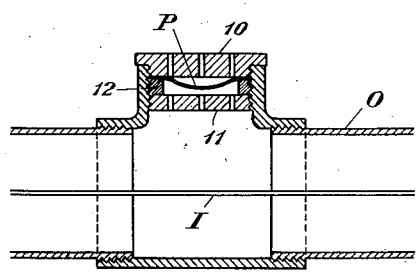
Figure 3:
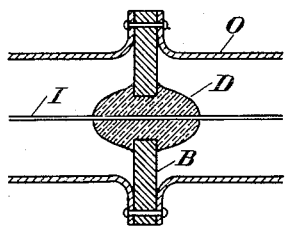
Figure 4:
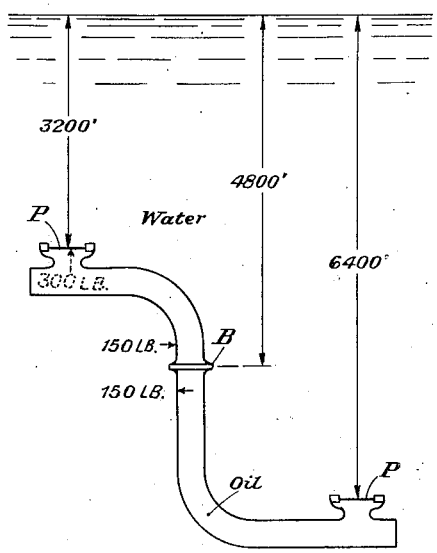
Figure 5:
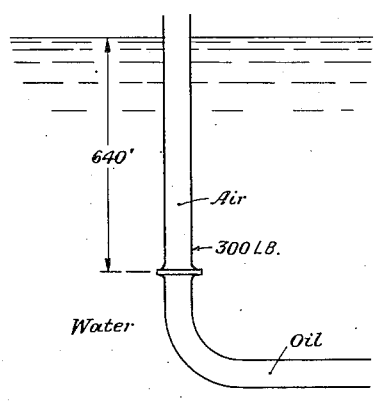
Figure 6:
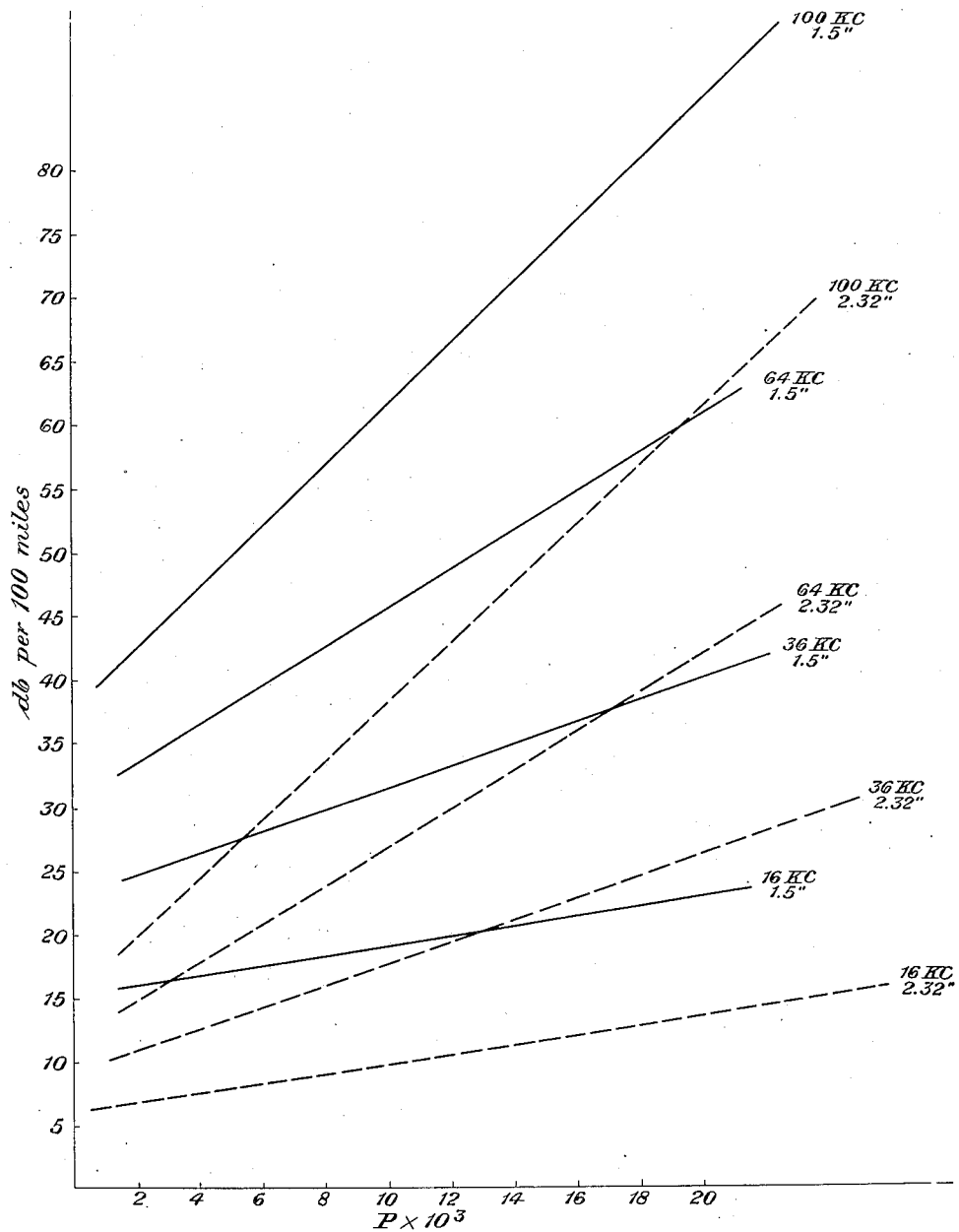

The invention will now be more fully understood from the following description when read in connection with the accompanying drawing in which Figure 1 shows schematically the structure of the concentric conductor system of the present invention; Fig. 2 shows in detail how the pressure equalizing diaphragms are applied to the outer conductor; Fig. 3 shows the structure of a transverse barrier separating two sections of the conducting system; Figs. 4 and 5 are schematic diagrams illustrating certain principles of the invention; and Fig. 6 is a series of curves illustrating the transmission characteristic of the system.

Referring to Fig. 1, a submarine transmission system is shown comprising an inner conductor I and an outer conductor O. The inner conductor I may be in the form of a cylindrical wire conductor of small dimension or it may be a hollow cylindrical conductor of somewhat larger diameter, as is common in concentric conductor structures. The outer conductor O is in the form of a hollow cylindrical pipe of conductive material concentrically arranged about the inner conductor I.

As the cable would be crushed at great depths by the external water pressure if air dielectric was used to fill the space between the inner and outer conductors, in accordance with the present invention this space is filled with a liquid dielectric, such as oil which, while it has a power factor somewhat greater than air, has a very much smaller power factor than ordinary solid dielectrics. As is well known, one of the advantages of a concentric conductor system employing air as the dielectric for separating the two conductors is that such a system will transmit high frequencies of the order of 1,000,000 cycles or more without undue attenuation. Such a system has the further advantage that it is relatively free from external interference tending to produce cross-talk in the system. While the use of oil or other suitable liquid as a dielectric results in some increase in attenuation, due to the power factor of the liquid dielectric, the system will still be capable of transmitting much higher frequencies without undue attenuation than a system employing a solid dielectric, such as is used in ordinary submarine cable construction.

Since the specific gravity of the liquid dielectric and that of water will not be the same, there will still be some crushing tendency due to the external pressure of the water at great sea depths. It is, therefore, proposed to equalize the internal and external pressures by providing water-tight diaphragms P at suitable intervals in the wall of the external conductor. These diaphragms are preferably arranged to yield inwardly in response to external pressure but not to yield outwardly in response to internal pressure. This result may be obtained by means of the structure shown in Fig. 2 in which the diaphragm P is clamped at its edges in the space between two plates 10 and 11. The outer plate 10 is provided with suitable openings so that the diaphragm P is subject to the external pressure of the sea water, and the inner plate 11 is likewise provided with openings so that the diaphragm P is also subjected to the internal pressure of the liquid which fills the outer conductor O. Since the diaphragm P has its edges clamped against the surface of the outer plate 10 but is separated from the surface of the inner plate 11 by means of the separating ring 12, internal pressures merely force the diaphragm against the wall of the plate 10 so that it cannot yield outwardly. External pressures applied through the openings in the plate 10, however, cause the diaphragm P to flex inwardly, as shown, and thereby to transfer the external pressure to the liquid confined within the walls of the external conductor O. If the dielectric liquid were free to flow throughout the space between the conductors from end to end of the system, the external pressure applied to one of the diaphragms P at the point where the depth of the sea water is greatest would tend to force the internal liquid out at the ends of the outer pipe O, due to the fact that the specific gravity of the oil is less than that of water.

For example, referring to Fig. 4, let us assume that at one point the pipe is submersed 6400 feet below the surface of the water. Allowing 15 pounds for each 32 feet of water, the diaphragm at this point would be subjected to an external pressure of 3000 pounds. Assuming that the other end of the pipe is elevated so that the diaphragm thereat would be submerged 3200 feet, the external pressure on the diaphragm at the end of the pipe would be 1500 pounds. If the pipe were filled with air the difference in pressure at the two points would be 1500 pounds. Assuming, however, that the pipe is filled with oil having a specific gravity $\frac{8}{10}$ that of water, the weight of the column of oil in the pipe would be 1200 pounds, so that there would be a resultant pressure upward on the upper diaphragm of 300 pounds. If the end of the pipe, instead of being submerged 3200 feet, was at the surface of the water, the resultant pressure tending to force the oil out at the end of the pipe would be 600 pounds, and such a pressure might be greater than the outer conductor could withstand.

In order to avoid this effect, it is proposed to divide the conductor into longitudinal sections separated by transverse barriers B, as shown in Fig. 1, with a pressure equalizing diaphragm P provided for each longitudinal section. The barriers B may be constructed as shown in Fig. 3. Here the barrier B comprises a circular plate whose ends are attached to the ends of the adjacent sections of the external conductor O. An insulator D is held within an opening in the center of the plate and the inner conductor I passes through the insulator D with a watertight fit so that the confined oil cannot pass from one section to the other.

The effect of the barriers may now be understood by referring to Fig. 4, assuming as before a section of hollow pipe with two diaphragms, one submerged 6400 feet below the surface of the water and the other submerged only 3200 feet below the surface of the water. As already stated, due to the fact that the oil is lighter than water, a resultant internal pressure of 300 pounds will be applied to the upper diaphragm. If, however, a barrier B is provided midway between the two diaphragms, as shown, so that it is located at a depth of 4800 feet, the external pressure just below the barrier will be only 150 pounds while the pressure on both sides of the lower diaphragm P will be just balanced. If the pressure on the upper diaphragm P (which is in a separate section of the cable) is equalized, there will be an external pressure just above the barrier B due to the difference between the weight of a column of water 1600 feet in depth and a 1600-foot column of oil. As the column of water would weight 750 pounds and the column of oil would only weigh 600 pounds, the resultant external pressure just above the diaphragm P will be 150 pounds.

It will thus be seen that by providing the barriers B at suitable intervals, as shown in Fig. 1, with equalizing diaphragms in each section of the system, the pressure will be equalized at the diaphragms and there will be a limited internal pressure at other points of each section.

If the transverse diaphragms were spaced 640 feet apart in Fig. 1, the maximum they would have to withstand would be 300 pounds to the square inch. This is on the supposition that the section of cable at some time during the process of laying would be in a vertical position and would be filled with air instead of oil until such time as it had been fully submerged, as shown in Fig. 5. The result would be that the full pressure of a column of water 640 feet high would be applied to the lower part of the section just above the barrier so that a pressure of 300 pounds would be applied at this point. Closer spacing of the transverse barriers would reduce this figure, a spacing of 320 feet being equivalent to a 150 pound limit, for example.

Let us now examine the electrical transmission characteristics of the system of Fig. 1.

The attenuation per unit length of such a transmission line is given by $$(1) \quad A = \frac{R}{2}\sqrt{\frac{C}{L}} + \frac{G}{2}\sqrt{\frac{L}{C}}$$

where R is the resistance, C the capacity, L the inductance and G the leakage conductance per unit length. The leakage conductance G can be made to include the power loss in the dielectric by setting $$(2) \quad G = PC\omega = 2\pi f PC \times 10^3$$

where P is the power factor and $f$ is the frequency in kilocycles, the factor $10^3$ being introduced into the last term because $f$ is used to represent kilocycles instead of cycles per second.

In the application of E. I. Green, Serial No. 365,520, filed May 23, 1929, it is shown that $$(3) \quad R = .0832\sqrt{f}\left(\frac{1}{b}+\frac{1}{c}\right) = K\sqrt{f} \text{ ohms per mile}$$

where $b$ is the outer diameter of the inner conductor, $c$ is the inner diameter of the outer conductor and K is a constant.

Also, if $C_1$ is the capacity with air as a dielectric, we may write $$(4) \quad C_1 = DC_1$$

where D is the dielectric constant of the insulating medium.

Substituting from equations (2), (3) and (4), equation (1) may be written $$(5) \quad \alpha = \frac{R}{2}\sqrt{D}\sqrt{\frac{C_1}{L}} + \frac{1}{2} \times 2\pi f PDC_1 \sqrt{\frac{L}{C_1 D}}$$
$$= \frac{1}{2}K\sqrt{fD}\sqrt{\frac{C_1}{L}} + \pi f P \sqrt{D}\sqrt{LC_1} \times 10^3$$

Since D becomes unity and P becomes 0 when the dielectric is air, the last term of equation (5) becomes 0 for the case of air dielectric and the attenuation $\alpha$ varies with the square root of the frequency. Hence, the effect of introducing a dielectric other than air is to increase the attenuation by a factor $\sqrt{D}$ and add a term whose magnitude depends upon the power factor P and which varies directly with the frequency.

Let us examine the behavior of such a conductive system for the case where $b=0.625''$ and $c=2.32''$, these values being representative of the best practice in the design of concentric conductor systems using air dielectric. For these dimensions equation (3) becomes $$(6) \quad R = 0.169\sqrt{f}$$

In the application of E. I. Green above referred to, it is shown that $$(7) \quad L = 0.7411 \log_{10}\frac{c}{b} \times 10^{-3} \text{ henries per mile}$$

which for the case under discussion becomes $$(8) \quad L = 0.422 \times 10^{-3}$$

In said Green application it is also shown that $$(9) \quad C_1 = \frac{.03883}{\log_{10}\frac{c}{b}} \times 10^{-6} \text{ farads per mile}$$

which for the chosen dimensions reduces to $$C_1 = .0681 \times 10^{-6} \text{ farads per mile}.$$

We may now write the following values:

$$(10) \quad \sqrt{\frac{C_1}{L}} = 1.27 \times 10^{-2}$$
$$\sqrt{LC_1} = 0.536 \times 10^{-5}$$

Substituting the values of equations (6) and (10) in equation (5), and assuming a dielectric material such as oil whose dielectric constant D is 2.5, we have

(11) $\quad a = 1.695 \times 10^{-3}\sqrt{f} + 2.661 \times 10^{-3} Pf$

Multiplying by 8.686 to reduce it to decibels per mile and multiplying by 100 to get the attenuation A per 100 miles of line, we have

(12) $\quad A = 1.472\sqrt{f} + 23.12 fP$

Using formula (12), the attenuation A of a circuit 100 miles in length has been computed for several values of P and for several frequencies, the results appearing in the following table:

Table I

| f in kc | P term (general) | P term $P=2\times10^{-3}$ | P term $P=8\times10^{-3}$ | P term $P=10^{-2}$ | P term $P=2\times10^{-2}$ |
|---|---|---|---|---|---|
| 16 | 370 P | 0.74 | 2.96 | 3.70 | 7.4 |
| 25 | 578 P | 1.156 | 4.62 | 5.78 | 11.56 |
| 36 | 832 P | 1.67 | 6.68 | 8.33 | 16.66 |
| 49 | 1131 P | 2.26 | 9.05 | 11.31 | 22.60 |
| 64 | 1477 P | 2.95 | 11.82 | 14.77 | 29.50 |
| 81 | 1870 P | 3.74 | 14.96 | 18.70 | 37.40 |
| 100 | 2312 P | 4.62 | 18.50 | 23.10 | 46.20 |

| f in kc | $\sqrt{f}$ term | A | A | A | A |
|---|---|---|---|---|---|
| 16 | 5.888 | 6.33 | 8.85 | 9.59 | 13.3 |
| 25 | 7.36 | 8.52 | 11.98 | 13.14 | 18.9 |
| 36 | 9.232 | 10.90 | 15.91 | 17.56 | 25.9 |
| 49 | 10.30 | 12.56 | 19.35 | 21.60 | 32.9 |
| 64 | 11.78 | 14.73 | 23.60 | 26.60 | 41.3 |
| 81 | 13.25 | 16.99 | 28.21 | 32.00 | 50.7 |
| 100 | 14.72 | 19.34 | 33.22 | 37.80 | 60.3 |

In Fig. 6, curves are plotted showing the variation of attenuation with power factor for different frequencies as given in the above table, the curves being drawn in dotted lines.

Now let us assume that a cheaper conductive system is designed by making the inner conductor a copper wire 0.1" in diameter and the outer conductor a copper cylinder whose inner diameter is 1.5". Equations (3), (7) and (9) now become

(13) $\quad R = .0832\sqrt{f}\left(\dfrac{1}{0.1} + \dfrac{1}{1.5}\right) = 0.888\sqrt{f}$

(14) $\quad L = 0.7411 \times \log_{10}\dfrac{1.5}{0.1} \times 10^{-3} = .8717 \times 10^{-3}$

(15) $\quad C_1 = \dfrac{.03883}{\log\dfrac{1.5}{0.1}} \times 10^{-6} = .03305 \times 10^{-6}$ Substituting in equation (5) and making the proper multiplications to give the attenuation in decibels per 100 mile line, we have

(16) $\quad A = 3.8\sqrt{f} + 23.4 Pf$

Again computing the attentuation for the several values of P and at the same frequencies as before, we have Table II

| f in kc | P term (general) | P term $P=2\times10^{-3}$ | P term $P=8\times10^{-3}$ | P term $P=10^{-2}$ | P term $P=2\times10^{-2}$ |
|---|---|---|---|---|---|
| 16 | 374 P | .748 | 2.992 | 3.74 | 7.5 |
| 25 | 585 P | 1.170 | 4.680 | 5.85 | 11.7 |
| 36 | 842 P | 1.684 | 6.736 | 8.42 | 16.8 |
| 49 | 1147 P | 2.294 | 9.176 | 11.5 | 23.0 |
| 64 | 1498 P | 2.996 | 12.00 | 15.0 | 30.0 |
| 81 | 1895 P | 3.790 | 15.16 | 19.0 | 38.0 |
| 100 | 2340 P | 4.680 | 18.72 | 23.4 | 46.8 |

| f in kc | $\sqrt{f}$ term | A | A | A | A |
|---|---|---|---|---|---|
| 16 | 15.2 | 16.0 | 18.2 | 18.9 | 22.7 |
| 25 | 19.0 | 20.2 | 23.7 | 24.6 | 30.7 |
| 36 | 22.8 | 24.5 | 29.5 | 31.2 | 39.6 |
| 49 | 26.6 | 28.9 | 35.8 | 38.1 | 49.6 |
| 64 | 30.4 | 33.4 | 42.4 | 45.4 | 60.4 |
| 81 | 34.2 | 38.0 | 49.4 | 53.2 | 72.2 |
| 100 | 38.0 | 42.7 | 56.7 | 61.4 | 84.8 |

The foregoing results are plotted for certain frequencies in full lines in Fig. 6.

Comparing equations (12) and (16), it will be noted that the P term (last term) of the attenuation is substantially the same for both sizes of conductor. Likewise, in the various columns of Tables I and II, the P terms are of about the same value in both tables. This part of the attenuation increases rapidly with frequency and also with the power factor P. For high values of P and $f$, the P term is much larger than the $\sqrt{f}$ term even in Table II, and in the case of Table I, where the $\sqrt{f}$ term is smaller due to the larger diameters of the conductors, the predominance of the P term is more marked.

A consideration of the curves of Fig. 6 leads to the conclusion that the increase in loss of the smaller conductor system is less important with a dissipative dielectric. The smaller cost of a conductor system of small dimensions may outweigh the relatively minor reduction in attenuation due to the use of larger conductors. For example, if oil having a power factor of $5\times10^{-3}$ is used as the dielectric, the attenuation of the large size conductor will be about 26.5 decibels at 100 kilocycles, as compared with 49.2 decibels for the smaller size conductor. The decreased cost of the small sized conductor might prove it in over the smaller loss of the larger sized conductor.

As a submarine transmission system of this type would be substantially free from external interference, the only noise encountered in the system would be the inherent molecular or resistance noise of conductors themselves. Even if we doubled the attenuation at 100 kilocycles by doubling the length of the system, we would still be well above the resistance noise level, so that the transmission could be brought up by a suitable terminal amplifier.

It will be obvious that the general principles herein disclosed may be embodied in many other organizations widely different from those illustrated without departing from the spirit of the invention as defined in the following claims.

What is claimed is:

1. A submarine cable comprising a central conductor, a cylindrical return conductor concentrically arranged with respect to said central conductor, a liquid insulating material in the space between the conductors, and pressure equalizing means in said cylindrical conductor, said pressure equalizing means being responsive to the pressure of the medium surrounding the cable.

2. A submarine cable comprising a central conductor, a cylindrical return conductor concentrically arranged with respect to said central conductor, a liquid insulating material in the space between the conductors, and a flexible diaphragm in said cylindrical conductor to equalize the pressure between the external sea water and said insulating liquid.

3. A submarine cable comprising a central conductor, a cylindrical return conductor concentrically arranged with respect to said central conductor, a liquid insulating material in the space between the conductors, and a flexible diaphragm in said cylindrical conductor to equalize the pressure between the external sea water and said insulating liquid, said diaphragm being arranged to yield inwardly in response to external pressures but not to yield outwardly from its normal position in response to excessive internal pressures.

4. A submarine cable comprising a central conductor, a cylindrical return conductor concentrically arranged with respect to said central conductor, a liquid insulating material in the space between the conductors, said cable being divided into sections, transverse barriers between the sections to prevent flow of said insulating liquid between sections, and pressure equalizing means associated with the wall of the cylindrical conductor of each section, said pressure equalizing means being responsive to the pressure of the medium surrounding the cable.

5. A submarine cable comprising a central conductor, a cylindrical return conductor concentrically arranged with respect to said central conductor, a liquid insulating material in the space between the conductors, said cable being divided into sections, transverse barriers between the sections to prevent flow of said insulating liquid between sections, and a flexible diaphragm in the cylindrical conductor of each section to equalize the pressure between the external sea water and the insulating liquid in the section.

6. A submarine cable comprising a central conductor, a cylindrical return conductor concentrically arranged with respect to said central conductor, a liquid insulating material in the space between the conductors, said cable being divided into sections, transverse barriers between the sections to prevent flow of said insulating liquid between sections, and a flexible diaphragm in the cylindrical conductor of each section to equalize the pressure between the external sea water and the insulating liquid in the section, said diaphragms being arranged to yield inwardly in response to external pressures but not to yield outwardly from their normal positions in response to internal pressures.

In testimony whereof, I have signed my name to this specification this 14th day of August 1930.

WILLIAM H. T. HOLDEN.